United States Patent [19]

Hecht

[11] Patent Number: 5,033,968
[45] Date of Patent: Jul. 23, 1991

[54] METHOD AND APPARATUS FOR SAFELY AND INTELLIGIBLY DIRECTING SOUND TO A FETUS

[75] Inventor: Kenneth B. Hecht, Jacksonville, Fla.

[73] Assignee: Prened, Inc., Jacksonville, Fla.

[21] Appl. No.: 435,586

[22] Filed: Nov. 13, 1989

Related U.S. Application Data

[63] Continuation-in-part of Ser. No. 226,529, Jul. 28, 1988, abandoned, which is a continuation of Ser. No. 823,067, Jan. 27, 1986, abandoned.

[51] Int. Cl.$^5$ .................. G09B 23/28; G09B 5/04; A45F 3/00
[52] U.S. Cl. .................. 434/262; 434/319; 224/224
[58] Field of Search ............... 128/897, 901, 915, 802; 446/295, 297, 299, 302; 434/262, 266, 236, 433, 273; 224/224-230

[56] References Cited

U.S. PATENT DOCUMENTS

| | | | |
|---|---|---|---|
| 3,822,486 | 7/1974 | Knapp | 434/273 |
| 3,947,974 | 4/1976 | Gordon | 434/266 |
| 4,008,714 | 2/1977 | Silva | 434/433 |
| 4,107,462 | 8/1978 | Asija | 446/297 |
| 4,161,945 | 7/1979 | Grossman | 128/901 |
| 4,408,615 | 10/1983 | Grossman | 128/901 |
| 4,411,629 | 10/1983 | Voights | 434/266 |
| 4,710,145 | 12/1987 | Hall Vandis | 446/302 |
| 4,802,879 | 2/1989 | Rissman | 446/297 |
| 4,905,700 | 3/1990 | Wokalek | 128/915 |
| 4,908,011 | 3/1990 | Jacobsen | 128/897 |

Primary Examiner—Robert A. Hafer
Assistant Examiner—Michael Brown
Attorney, Agent, or Firm—Arthur G. Yeager

[57] ABSTRACT

Method and apparatus are provided to present voices or music to a fetus in a manner in which the sounds more accurately resemble the same sounds as the baby will hear after birth. An apparatus is disclosed for directing sound to a fetus in a mother's womb, which includes a contouring filter, having as an input an electronic signal representing such sound, for modifying the magnitude of the signal at any frequency generally inversely proportional to the attenuation of that frequency by the body of the mother over at least a portion of the audible range of frequencies; an amplification circuit to amplify the output signal of the contouring filter; and a speaker having as an input the output of the amplification circuit.

17 Claims, 2 Drawing Sheets

METHOD AND APPARATUS FOR SAFELY AND INTELLIGIBLY DIRECTING SOUND TO A FETUS

CROSS REFERENCE TO RELATED APPLICATIONS

This application is a continuation-in-part of U.S. application Ser. No. 07/226,529, filed July 28, 1988, now abandoned, which was a continuation of U.S. application Ser. No. 06/823,067 filed Jan. 27, 1986, now abandoned.

BACKGROUND OF THE INVENTION

This invention relates to the generation of sounds into the womb of an expectant mother. More specifically, this invention provides a means to present voices or music to a fetus in a manner that the sounds more accurately resemble the same sounds as the baby will hear after birth.

It has been shown that a fetus hears sounds as early as the fifth month of pregnancy. The present invention is useable as an experimental tool to direct sounds to a fetus so that such sounds are more accurately presented to the fetus in its environment as such sounds would normally be heard after birth. Thus, the experience a fetus has in hearing sounds, including the father's and mother's voices, may aid in early language development and bonding between parents and the child. Such experimental tools can be provided to expectant mothers and none to other expectant mothers, and psychologists and developmental specialists will be able to study the effects of such sounds on the children on both groups of such mothers.

Studies have been conducted on both the ability of the fetus to hear noises as well as the ability of sounds to reach the fetus from outside the mother's body. One such recent study was discussed in "Perception auditive et reactivite foetale aux stimulations sonores," by D. Querleu et al., *J. Gyn. Obst. Biol. Repr.*, 1981, Vol. 10, pp. 307–314 ("Auditory Perception and Reaction to Sonor Stimulation"). The authors of this article investigated the level of sound within the uterus, both internal background noise as well as external noise passing through the body. The article indicates that the global intensity of background noise within the uterus is about 65 decibels. Furthermore, it was found that sound is increasingly attenuated as the frequency increases, at the rate of six to twelve decibels per octave, and that for sounds above 2000 hertz a dangerously loud sound would be required to overcome background levels within the body. Finally, for a sound source of 110 decibels, the attenuation of the signal at 1,000 hertz is about 20 decibels.

SUMMARY OF THE INVENTION

The present invention provides an easily usable personal device to provide sounds to the fetus determined by the parents, such as the parents' own voices. Furthermore, to the extent such sounds are audible, the present invention is designed to cause such sounds within the uterus to resemble closely the sounds as heard outside the body. Also, the invention is useable in experimental groups of expectant mothers to determine the effects on the children who received such sounds from the mothers while in a fetal state as compared to other children not receiving sounds via this invention.

This is accomplished by a method, and device for carrying out the method, by which the sounds to be transmitted are recorded on electronic media, such as a tape recorder, and, when the sounds are to be transmitted to the fetus, the output of the playback device is contoured and amplified and then generates sound through a speaker. For instance, the earphone output of a standard tape recorder may be input to a circuit which contours the signal along the frequency range to compensate for the body's attenuation of the signal. An amplification/limiter circuit generates the signal to drive the speaker. The volume may be controlled by the sound source (e.g., tape recorder) volume control, with the amplification circuit including a means for indicating when the signal level is sufficient to generate an audible sound to the fetus. The output of the amplification circuit is input to a speaker. It is desirable that the speaker be relatively small so that it may be placed close to the mother's abdomen, and preferably the speaker will be provided with a sound isolation means surrounding its opening, such that when placed against the abdomen, extraneous noise will be kept out and the relatively loud sound will be muffled with respect to the mother and others in the immediate area.

The amplification/limiter circuit also may include limitation means for preventing the levels of sound coming from the speaker from reaching excessive and undesirable levels.

The preferred sound range for such a device is to have output sound in the 1000 to 2000 hertz range on the order of 90 to 95 decibels. For frequencies less than 1000 decibels, the output should roll off at about 6 to 12 decibels per octave. Although not necessary, it may also be desirable to filter out frequencies above 2000 hertz, since those frequencies are not readily transmitted through the body of the mother.

Therefore, it is an object of this invention to provide a method and apparatus of introducing controlled sound into the womb of an expectant mother so that the sounds may be heard by the fetus and will sound similar to the sounds as actually perceived outside the body. It is also an object of this invention to provide a device which can be used in experimenting with the effects of more accurate representation of sounds to a fetus.

These and other objects and advantages will appear from the following description of the preferred embodiment with reference to the drawings.

DESCRIPTION OF THE PREFERRED EMBODIMENT

The preferred embodiment is now described with reference to the drawings.

Figure 1:
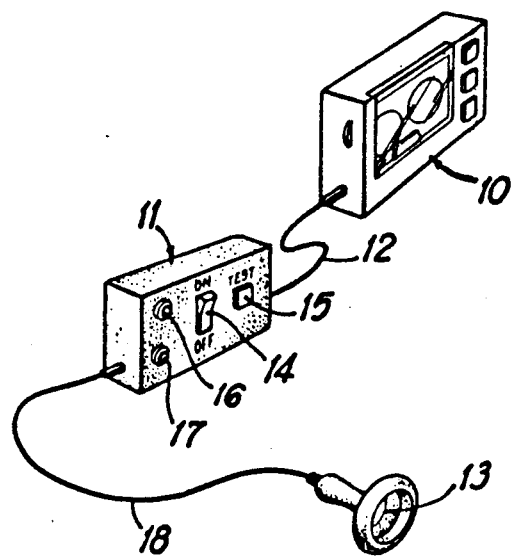
FIG. 1 shows the elements of complete system for directing sound to a fetus.

FIG. 1 shows the main elements of the present invention. A standard tape recorder and playback unit 10, preferably a compact unit, is attached to an electronic signal modification module 11 which incorporates the contouring circuitry and the amplification/limitation circuitry described in detail below. The connection is made with a standard two conductor wire 12 connected between an earphone output of the tape playback unit 10, which cuts out any integral speaker of the tape playback unit, and the input to the signal modification module 11. The output of the module 11 is connected to a speaker unit 13, suitably small and encased to be individually handled by two-conductor wire 18. Preferably, the speaker unit will have an opening with cushioning around the periphery of the speaker to cause the actual speaker to be held away from the body when the speaker unit 13 is held against the abdomen, whereby the cushioning will also serve as sound insulation.

The signal modification module 11 has an on-off switch 14, as well as a test switch 15, a green light emitting diode 16 to indicate sufficient input volume, and a red light emitting diode 17 to indicate excessive input volume.

Figure 2:
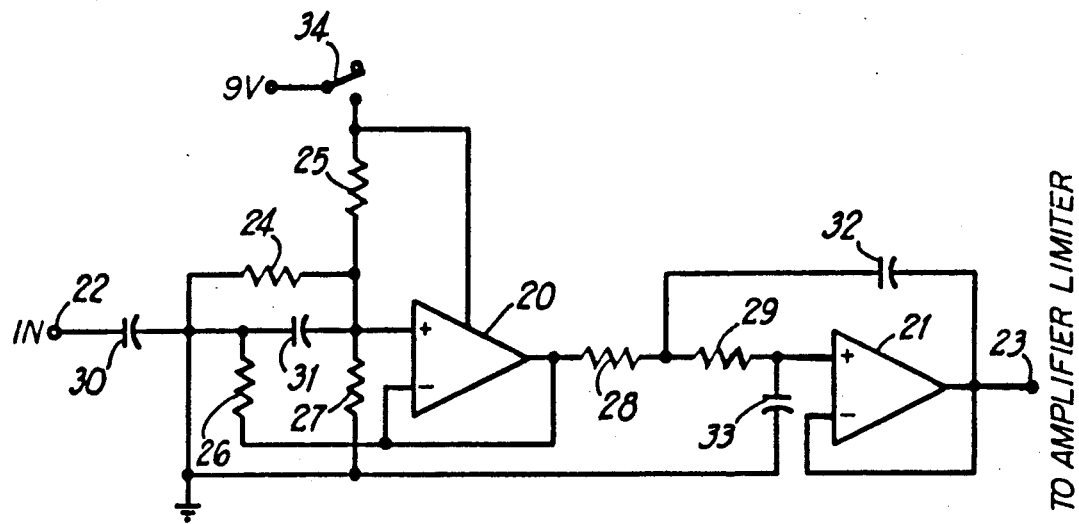
FIG. 2 is an electrical schematic of the signal contouring circuit of the present invention.

FIG. 2 shows the schematic diagram of the contouring section of the electronic circuitry. Amplifier 20 and its associated circuitry provides a high pass filter which passes signals above 1 kilohertz and contours the input signal, from input 22, from 100 hertz to 1 kilohertz to compensate for the attenuation effects on these frequencies caused by the sound passing through the mother's body. In this way, the response inside the body should more clearly follow the response curve of the source. Amplifier 21 and its associated circuitry provides low pass filter which attenuates signals above 2 kilohertz. The contoured source signal is at output 23.

Amplifiers 20 and 21 are operational amplifiers, such as TLC 27 M2CP manufactured by Texas Instruments. Circuit element Values are resistors 24: 900 Kohm; 25: 150 Kohm; 26: 22 Kohm; 27: 90 Kohm; 28: 20 Kohm; and 29: 22 Kohm; and capacitors 30, 31, 32 and 33 each 0.0047 microfarad. Switch 34 controls the 9 volt battery power supply to the amplifiers 20, 21.

Figure 3:
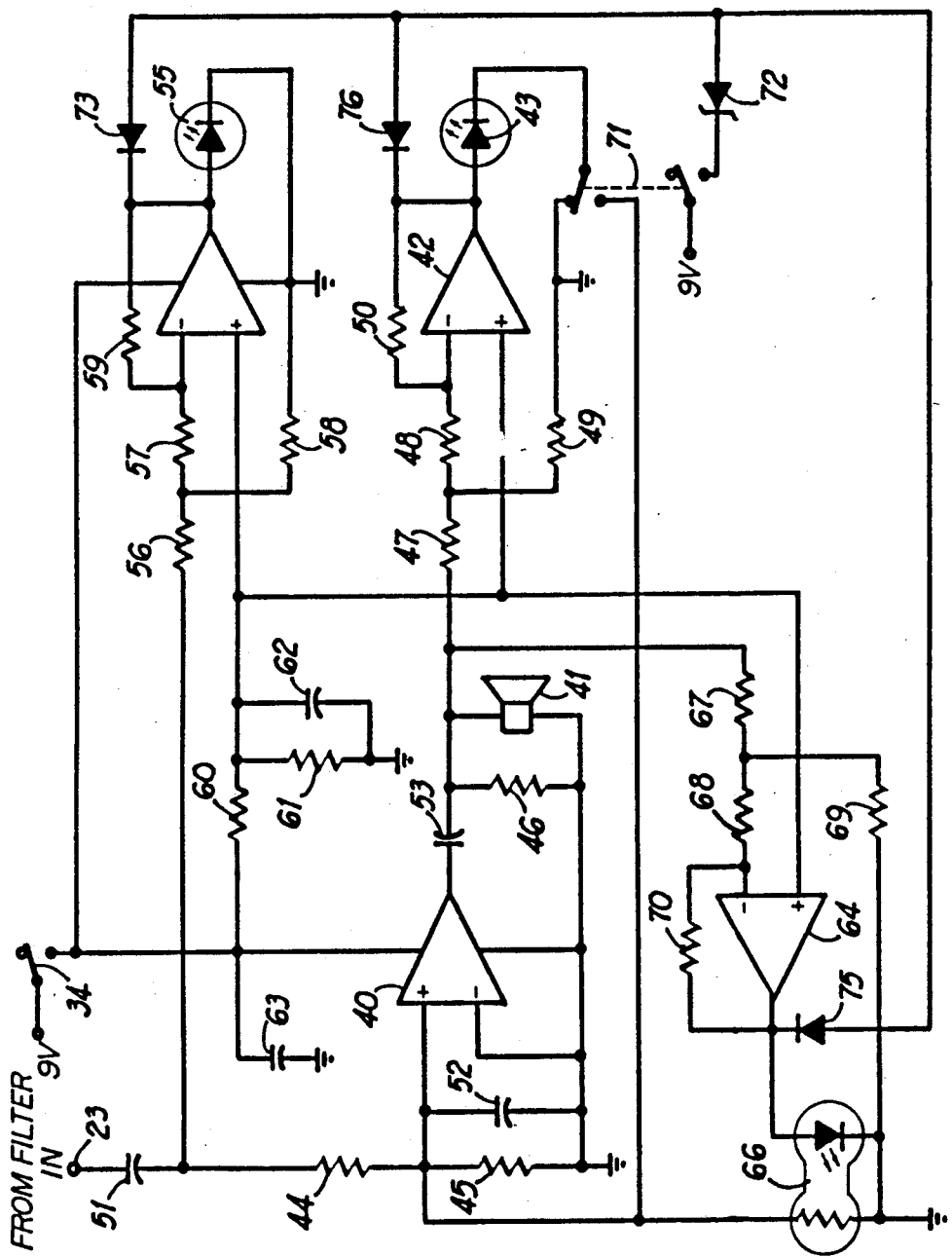
FIG. 3 is an electrical schematic of the amplification/limitation circuit of the present invention.

FIG. 3 shows a schematic of the amplifier/limiter circuitry. The output from the contouring circuitry of FIG. 2 is input to the amplification circuitry related to amplifier 40. The output of the amplification circuitry drives speaker 41 which is the sound output device incorporated within the speaker unit 13 of FIG. 1. The circuitry associated with operational amplifier 42 monitors the amplification output going to the speaker 41 and causes green light emitting diode 43 to go on when the signal level is sufficient to cause the sound output of the speaker to be at the desired level.

Amplifier 40 is an LM 386 and operational amplifier 42 is an LM 324, which are both manufactured by Radio Shack. The circuit elements associated with amplifer 40 and 42 are resistors 44: 5 Kohm; 45: 5 Kohm; 46: 10 ohm; 47: 470 ohm; 48: 2.2 ohm; 49 312 ohm; 50: 22 Kohm; and capacitors 51; 0.15 microfarad; 52: 0.01 microfarad; and 53: 220 microfarad. Switch 34 controls the power to all of the amplifiers in FIG. 3 as well as those of FIG. 2.

The amplifier/limiter circuit also has an excessive input indicator associated with operational amplifier 54 which is an LM 324, which indicates when the input signal from the contouring circuit is unnecessarily high by causing a red light emitting diode 55 to go on. Although the circuit does not limit the output signal, it does indicate to the user that the source signal is higher than necessary and may be distorted. The circuit elements associated with amplifier 54 are resistor 56: 560 ohm; 57: 2.2 Kohm; 58: 470 ohm; 59: 22 Kohm; 60: 1 Mohm; 61: 10 Kohm; and capacitors 62: 10 microfarad and 63: 100 microfarad.

The output signal is limited by the circuitry associated with operational amplifier 64 which is an LM 324, which monitors the signal going to the speaker. When that signal exceeds the desired upper level, the output of operational amplifier 64 will turn on the diode portion of photo-conductive module 66, which is a VTL 5C9 which is manufactured by Vactec, Inc. The light output of the diode portion of module 66 is directed to the light sensitive resistor portion of the module, which is connected to the input to amplifier 40. The resistance of the module drops as the intensity of the diode increases. In this manner, a negative feedback is provided which ensures that the output sound will not be excessive, no matter what the input signal level is. The circuit elements associated with amplifier 64 are resistors 67: 520 ohm; 68 2.2 Kohm; 69: 130 ohm; and 70: 22 Kohm.

A check circuit is also provided by switch 71 to test the operation of light emitting diodes 43 and 55 and the photo-conductive module 66. When test switch 71 is set to test mode, a power level is sent through a 5.6 volt zener diode 72 an through diodes 73, 74 and 75. If light emitting diode 55 is operational, it will light. If both light emitting diode 43 and the photo-conductive module 66 are operational, diode 43 will light. Neither light will come on if the batteries are low.

The system as described is utilized by making a recording of the voices or other sounds to be transmitted, or prerecorded tapes may be used. The mother then inserts the tape to be played into the tape unit, turns on the module switch 14, turns on the play mode of the tape playback unit and adjusts the volume of the tape playback unit until the green light emitting diode starts blinking. If the red light emitting diode starts blinking, the volume may be reduced. The mother then places the speaker unit against her abdomen to direct the sound to the fetus.

While the invention has been described in detail with particular reference to the preferred embodiment thereof, it will be understood that variations and modifications can be effected within the spirit and scope of the invention as previously described and as defined by the claims.

What is claimed is:

1. A method for transmitting and directing sound to a fetus in a mother's womb, comprising the steps of:
    contouring an electronic signal representation of said sound such that the magnitude of the signal at any frequency is proportionally modified to compensate for the attenuation of that frequency by the body of the mother;
    amplifying said contoured signal sufficient to provide output sound which will have a sound level in the womb above the background noise in the womb, thus allowing the sound level to be audible and intelligible to the fetus;
    directing said amplified signal to a speaker; and
    placing said speaker in close proximity to the mother's abdomen.

2. The method of claim 1, which further comprises the steps of limiting the level of said amplified signal such that the sound reaching the womb will not be excessive.

3. The method of claim 1, wherein said electronic representation of sound is output from a sound recording playback apparatus.

4. The method of claim 1, wherein said contouring step comprises attenuating said electronic signal at frequencies below 1000 hz.

5. The method of claim 4, wherein said attenuation is approximately 12 decibels per octave.

6. The method of claim 1, wherein said amplification is such that the peak output of the speaker is about 90 decibels.

7. An apparatus for directing sound to a fetus in a mother's womb, which comprises:
   contouring filter means, having as an input an electronic signal representing said sound, for modifying the magnitude of said signal at any frequency generally inversely proportional to the attenuation of that frequency by a body of a mother over at least a portion of the audible range of frequencies;
   an amplification circuit to amplify an output signal from said contouring filter means; and
   a speaker having as input an output of said amplification circuit said speaker including sound isolation means on all sides except that oriented towards a mother's womb, whereby sound from said speaker is not substantially transmitted in any direction except towards a mother's womb.

8. The apparatus of claim 7, which further comprises a limiting circuit which limits the output of the amplification circuit so that it will not exceed a predetermined level.

9. The apparatus of claim 8, wherein said predetermined signal limiting level is that associated with approximately 95 decibels of sound from said speaker.

10. The apparatus of claim 8, wherein said limiting circuit comprises a photo-conductive module which consists of a light emitting diode, responsive to the output of the amplifier circuit when it exceeds said predetermined level, and an associated photo-conductive resistor connected between the amplifier circuit signal input and ground.

11. The apparatus of claim 7, which further comprises:
   a recording and playback device for generating said electronic signal to said contouring filter, having output volume control means;
   means for indicating when the volume of said recording and playback device is sufficiently high to produce output from the amplifier circuit of the desired level.

12. The apparatus of claim 7, wherein said contouring filter means comprises a high pass filter which begins to attenuate the input signal at about 1 kilohertz and increasingly attenuates said signal as the frequency decreases.

13. The apparatus of claim 12, wherein said attenuation if about 12 decibels per octave.

14. The apparatus of claim 12, wherein said contouring filter means further comprises a low pass filter to attenuate the frequencies above 2 kilohertz.

15. A method for transmitting and directing sound to a fetus in its mother's womb comprising:
   providing a sonic source means for transmitting sound to a fetus in its mother's womb, positioning said sonic source means adjacent to and in sonic vibration transmitting relation to the mother's abdomen; and
   transmitting a desired communication in sonic wave form into the womb from said sonic source means.

16. A device for communicating with an unborn fetus comprising:
   a sonic source means for generating in sonic form a communication to a fetus in its mother's womb;
   said sonic source means being mounted on positioning means;
   said positioning means locating said sonic source means adjacent the mother's abdomen;
   said sonic source means being oriented on said positioning means to transmit sonic vibrations to the mother's womb; and
   sound isolation means located in said positioning means around said sonic source means on all sides except that oriented towards the mother's abdomen whereby sound from said sonic source means is not substantially transmitted in any direction except towards the mother's womb.

17. The method of transmitting and directing sound information to an unborn fetus, providing the mother with a sonic vibration generating source; placing the generating source on the mother's abdomen and providing means for activating the generating source, controlling the generating source to produce sonic vibrations in a selected pattern for producing a desired response on the part of the fetus.

* * * * *